United States Patent [19]
Wendorf

[11] Patent Number: 5,026,083
[45] Date of Patent: Jun. 25, 1991

[54] CYCLE FENDER MOUNT

[76] Inventor: Wayne S. Wendorf, 1801 N. 66th Ave., Phoenix, Ariz. 85035

[21] Appl. No.: 566,079

[22] Filed: Aug. 13, 1990

[51] Int. Cl.⁵ .............................................. B62K 25/08
[52] U.S. Cl. .................................... 280/277; 280/276; 280/152.3; 280/152.1; 280/157; 293/105
[58] Field of Search ................. 180/219, 227; 280/275, 280/276, 279, 152.1, 152.2, 852, 157, 158.1, 160.1, 156, 152.3; 293/102–105, 141

[56] References Cited

U.S. PATENT DOCUMENTS

| 455,673 | 7/1891 | Vincent | 280/285 |
| 1,273,179 | 7/1918 | Perry et al. | 180/219 |
| 2,976,056 | 3/1961 | Henry | 280/277 |

FOREIGN PATENT DOCUMENTS

| 0049600 | 12/1934 | Denmark | 280/276 |
| 0467213 | 6/1914 | France | 180/219 |
| 0585904 | 2/1947 | United Kingdom | 280/276 |

Primary Examiner—Charles A. Marmor
Assistant Examiner—A. M. Boehler
Attorney, Agent, or Firm—Cahill, Sutton & Thomas

[57] ABSTRACT

A front fender mount for a cycle employing a springer mount suspension system includes glide assemblies mounted for sliding movement along components of the suspension system. The glide assemblies are connected by push rods to rocker arms at the wheel axle. Arcuate up and down movement of the wheel is replicated as linear movement of the fender to maintain spacing between the two.

6 Claims, 2 Drawing Sheets

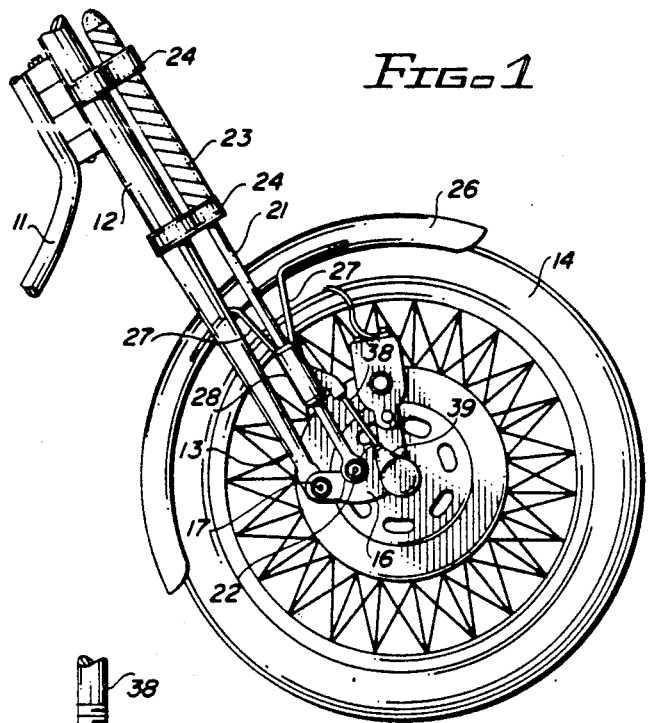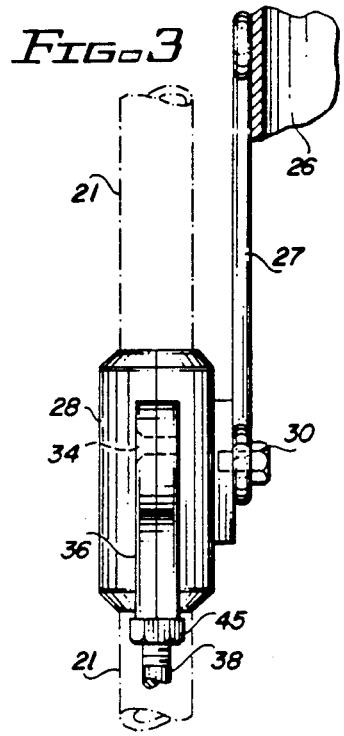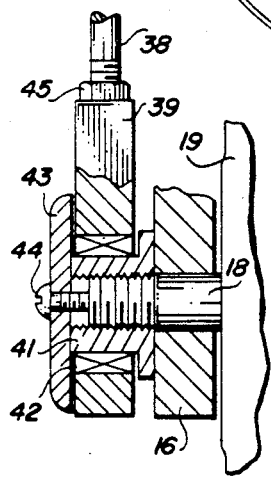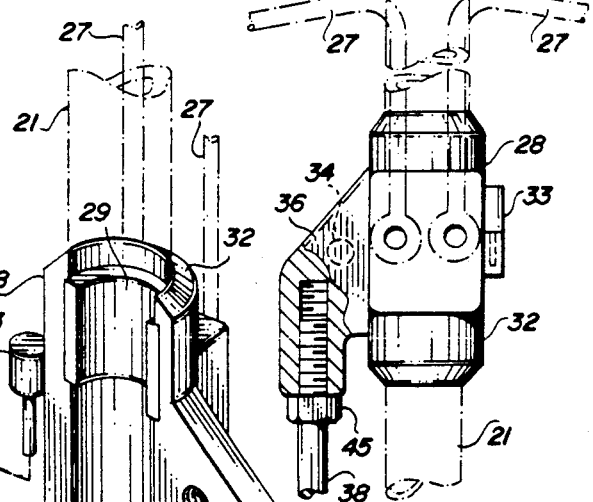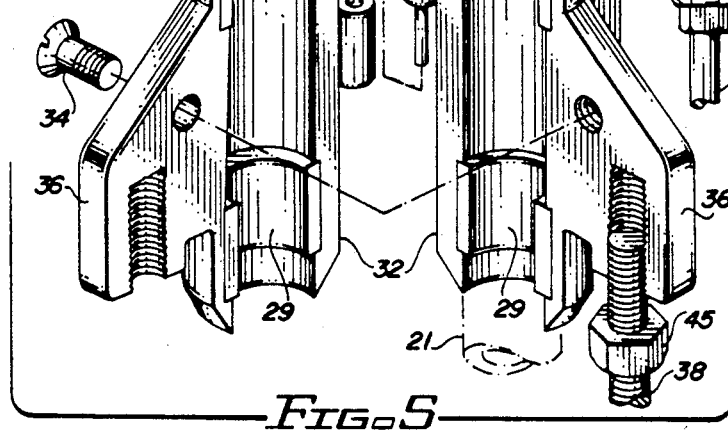

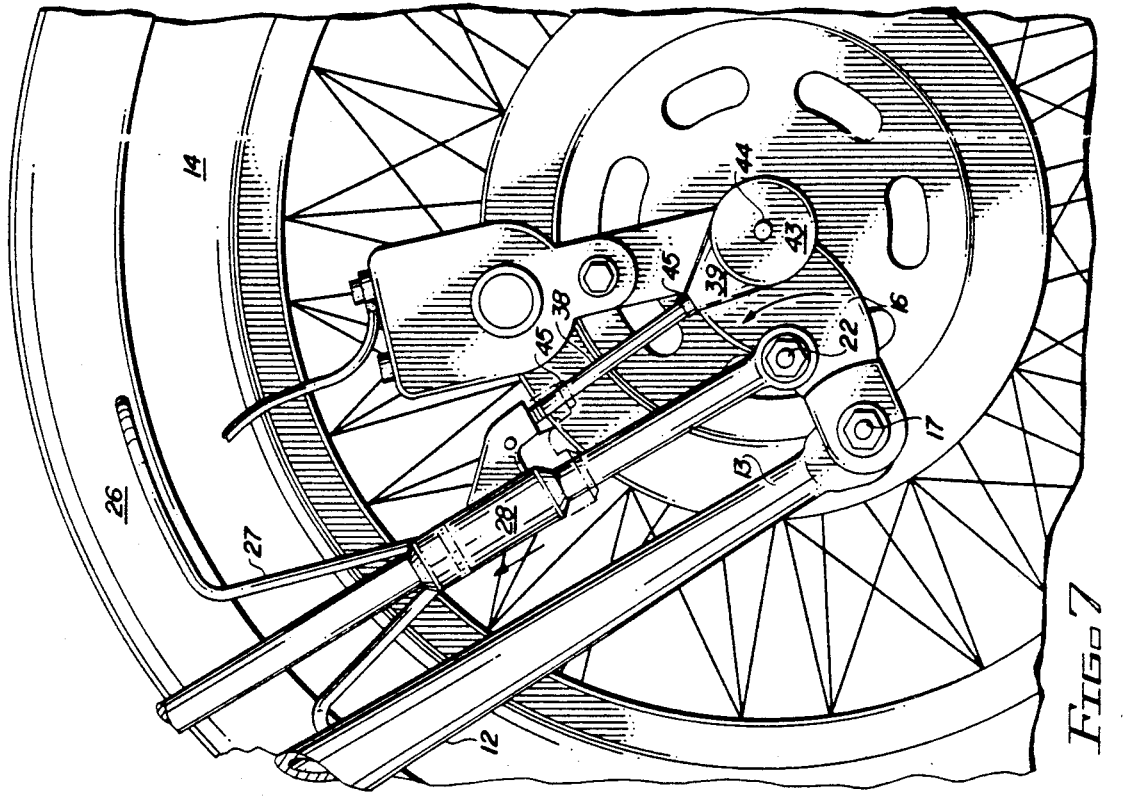
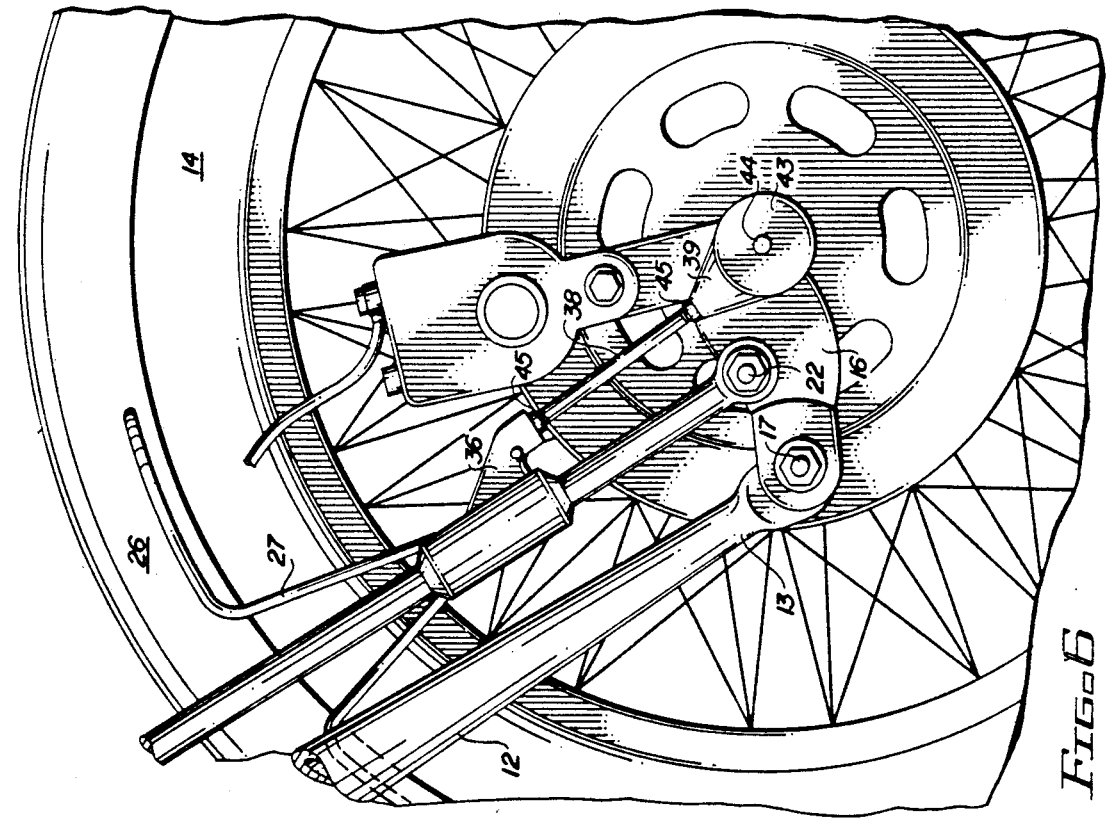

CYCLE FENDER MOUNT

TECHNICAL FIELD

This invention is concerned with mounting a fender on a motorcycle on which the wheel covered by the fender is mounted in a particular suspension system.

BACKGROUND ART

Particularly popular among cycling enthusiasts is a front wheel suspension system commonly known as the "springer mount". The springer mount utilizes a rigid, forked yoke with the wheel mounted between the ends of a pair of rocker arms pivotally connected to the distal ends of the yoke tines. Road shocks imparted to the wheel are transmitted to a spring assembly by a pair of connecting rods which are pivotally attached to the rocker arms between the axle of the wheel and the connections with the yoke.

The springer suspension system permits relative up and down motion of the wheel with respect to the yoke along an arcuate path. In prior cycles utilizing the springer suspension system it has been customary to rigidly mount a fender on the yoke sufficiently far above and behind the wheel as to provide clearance for the significant and rather unusual movement of the wheel permitted by the suspension system. For many cycles the fender has been raised from the wheel by as much as four to five inches. This gap between the wheel and the fender allows excessive amounts of debris to be thrown past the fender onto the cycle and its rider.

The raised fender presents another problem as well because of aerodynamic loads, such as buffeting, which are imposed on the exposed fender. To reduce these loads the practice has been to reduce the length of the fender thereby further reducing its effectiveness in shielding debris from the cycle and the rider.

Some prior inventors have proposed mounting the fender of a cycle in such a manner that it moves with the wheel. This is relatively easy to do with a telescoping yoke suspension system, but not so with a springer suspension system.

U.S. Pat. No. 455,673 granted July 7, 1891 to D. P. Vincent for "Bicycle" discloses a fender mounting arrangement in which the fender moves up and down with the wheel. But the arrangement can only accommodate straight line up and down movement of the wheel axle.

U.S. Pat. No. 2,976,056 granted Mar. 21, 1961 to J. D. Henry for "Bicycle Suspension System" discloses another fender mounting arrangement for wheels which are mounted in rocker arms. The arrangement there disclosed produces undesirable rocking motion of the fender when the suspension system is flexed.

DISCLOSURE OF THE INVENTION

This invention enables the fender to be positioned close to the wheel and to move up and down as the wheel moves up and down. The mount utilizes a pair of push rods having their lower ends pivotally connected to the rocker arms at the wheel axle. The upper ends of the push rods are connected to glide assemblies mounted for sliding movement along other suspended components, such as the connecting rods. Brackets affixed to the glide assemblies support the fender in close proximity to the periphery of the wheel.

BRIEF DESCRIPTION OF THE DRAWING

The invention is disclosed in greater detail hereinafter by reference to the accompanying drawings wherein:

FIG. 1 is a fragmentary elevational view of the front wheel assembly of a cycle equipped with the fender mount of this invention;

FIG. 2 is an enlarged fragmentary sectional view through the axle region of the wheel assembly of FIG. 1;

FIG. 3 is a front view of a glide assembly employed in the invention;

FIG. 4 is an inside view of the glide assembly shown in FIG. 3;

FIG. 5 is an exploded perspective view illustrating construction of the glide assembly of FIGS. 3 and 4; and FIG. 6 and 7 are enlarged fragmentary elevational views illustrating operation of the fender mount of the invention.

BEST MODES FOR CARRYING OUT THE INVENTION

Referring particularly to FIG. 1, the numeral 11 designates the frame of a motorcycle. Only a portion of the frame is shown. Pivotally mounted at the front end of the frame is a forked yoke 12 the tines 13 of which extend down opposite sides of the cycle front wheel 14.

Connection between the wheel 14 and the yoke 12 is provided by a pair of rocker arms 16 pivotally connected at 17 to the distal ends of the fork tines 13. The forward ends of the rocker arms are connected to an axle 18 passing through the hub 19 of wheel 14 (see FIG. 2).

The wheel suspension system further includes a pair of connecting rods 21 having their distal, or lower, ends pivotally connected at 22 to the rocker arms 16. Note that the pivotal connection 22 between each connecting rod 21 and its rocker arm 16 is intermediate, i.e. between, the connections between the rocker arm 16 and the yoke 12 and the wheel axle 18. Thus, as wheel axle 18 moves up and down in an arc about pivotal connections 17 connecting rods 21 are caused to move up and down as well, but through a lesser distance than the axle. Furthermore, because the push rod connections 22 ar closer to pivotal connection 17 than is the wheel axle, motion of the connecting rods is less arcuate and more nearly axial.

The other major component of a springer-type suspension system is a spring assembly 23 mounted by means of brackets 24 on the front of yoke 12. The proximal, or upper, ends of the connecting rods 21 are connected to the spring assembly 23 so that the spring assembly cushions up and down movement of the wheel 14. The spring assembly may also include a shock absorber or damper (not shown).

Yoke 12, rocker arms 16, wheel 14, connecting rods 21 and spring assembly 23 thus constitute a springer mount wheel suspension system which, in the past, has presented problems in mounting a fender, indicated at 26. In accordance with this invention the fender 26 is mounted by means of brackets 27 onto glide assemblies 28 which, in turn, are mounted for sliding movement on, preferably, the connecting rods 21. The brackets may be welded or otherwise secured to the fender 26 and secured to the glide assemblies 28 by stud bolts 30 (see FIG. 3).

It is contemplated that the fender mount of this invention ma be marketed as a kit to retrofit existing cycles.

To facilitate installation of the glide assemblies they are preferably split longitudinally into two parts 31 and 32 joined by a separable hinge connection 33 (see FIGS. 4 and 5). The two parts 31 and 32 are held together after installation by means of a screW 34 passing through split parts of a lug 36 protruding from the side of the glide assembly opposite the hinge connection 33.

Each glide assembly 28 also preferably is provided internally With cylindrical bushings 29 which are also split for ease of installation (see FIG. 5). To reduce wear on connecting rods 21 bushings 29 are preferably molded from an unctuous plastic material, such as nylon, or polyethylene, or Micarta brand filled plastic.

Each glide assembly 28 is connected for movement with a rocker arm 16 at the axle 18 of the wheel 14. This connection is provided by a push rod threadably received in the lug 38 protruding from the side of the glide assembly. The opposite, or lower, end of each push rod is threadably received in an annular terminal 39 (see FIG. 2). Terminal 39 slips over and is separated from a round threaded nut 41 on axle 18 by a bearing 42. A retainer disk 43 held in place by screw 44 holds terminal 39 in place. This pivotal connection betWeen each push rod 38 and its rocker arm 16 through axle 18 permits the push rod to undergo essentially linear movement although the rocker arm and axle are undergoing swinging arcuate movement. Moveover, by connecting the push rods 38 to their respective rocker arms 16 through the wheel axle it is not necessary to modify the existing rocker arms when retrofitting a cycle with the fender mount of this invention.

Adjustment of the fender mount of this invention to position fender 26 the desired distance from the periphery of wheel 14 is effected by altering the distance between each lide assembly 28 and its cooperating annular terminal 39. With oppositely turned threads at opposite ends of push rods 38 this adjustment can be made by simply turning the push rods. Once the desired fender position is achieved lock nuts 45 ar tightened to maintain the components in their proper positions.

FIGS. 6 and 7 illustrate the manner in which the position of fender 26 relative to wheel 14 is maintained as the wheel moves within the suspension system. Regardless of whether the wheel 14 is moving up or down in relation to the frame of the cycle it is faithfully followed by the fender 26. With the mount of this invention it is thus possible to position the fender 26 quite close to, within an inch of, the periphery of the wheel 14. With the fender thus positioned it and the wheel function together aerodynamically. As a result the fender is not subjected to aerodynamic buffeting and can be made of a length sufficient to fend off all debris kicked up by the wheel.

From the foregoing it should be apparent that this invention provides an improved fender mounting system for cycles equipped with a springer mount suspension system. Certainly, modifications within the scope of the invention may be made. For example, the connecting rods 21 and the tines 13 of the fork 12 can be viewed as similar suspension components so that the glide assemblies 21 could be mounted on the fork tines instead of on the connecting rods.

What is claimed is:

1. In combination,
   a cycle wheel suspension system comprising first and second suspension components, said first suspension component comprising a yoke, said second suspension component the other of said comprising a pair of connecting rods, a pair of rocker arms pivotally connected to said yoke, a wheel having an axle extending between said rocker arms, said connecting rods having distal ends pivotally connected, respectively, to said rocker arms intermediate said yoke and said axle, and a spring assembly connected between said first and second suspension components whereby road shocks imparted to the wheel are transmitted to said spring assembly by movement of said connecting rods,
   and an improvement comprising fender mounting means,
   said mounting means comprising a pair of push rods each having one end pivotally connected to one of said rocket arms near said axle, a glide assembly mounted for sliding movement along each of said first or second suspension components, said push rods each having an opposite end connected, respectively, to one of said glide assemblies, a fender partially surrounding said wheel and brackets connecting said fender to said glide assemblies.

2. The combination set forth in claim 1 further characterized in that pivotal connections for said one ends of the push rods are coaxial with said axle.

3. The combination set forth in claim 1 further characterized in that each of said glide assemblies includes separable components enabling the glide assemblies to be clamped around their respective suspension components.

4. In combination,
   a cycle wheel suspension system comprising a yoke, a pair of rocker arms pivotally connected to said yoke, a wheel having an axle extending between said rocker arms, a pair of connecting rods having distal ends pivotally connected, respectively, to said rocker arms intermediate said yoke and said axle, and a spring assembly carried by the cycle, said connecting rods having their proximal ends connected to said spring assembly whereby road shocks imparted to the wheel are transmitted to said spring assembly by substantially axial movement of said connecting rods, and
   an improvement comprising fender mounting means, said fender mounting means comprising a pair of push rods each having one end pivotally connected to one of said rocker arms near said axle, a glide assembly mounted for sliding movement along each of said connecting rods, said push rods each having an opposite end connected, respectively, to one of said glide assemblies, a fender partially encircling said wheel and brackets connecting said fender to said glide assemblies.

5. The combination set forth in claim 4 further characterized in that the pivotal connections for said one ends of the push rods are co-axial with said axle.

6. The combination set forth in claim 4 further characterized in that each of said glide assemblies includes separable components enabling the glide assemblies to be clamped around their respective connecting rods.

* * * * *